United States Patent [19]

Vehrs, Jr.

[11] 3,795,909

[45] Mar. 5, 1974

[54] TERRAIN-FOLLOWING RADAR SYSTEM
[75] Inventor: Charles L. Vehrs, Jr., Anaheim, Calif.
[73] Assignee: North American Rockwell Corporation, El Segundo, Calif.
[22] Filed: Oct. 12, 1971
[21] Appl. No.: 188,384

[52] U.S. Cl.......... 343/7 TA, 343/5 DP, 343/16 M, 343/17.1 R
[51] Int. Cl............................................. G01s 9/22
[58] Field of Search...343/7 TA, 17.1 R, 16 M, 5 DP

[56] References Cited
UNITED STATES PATENTS

| | | | |
|---|---|---|---|
| 3,487,405 | 12/1969 | Molho et al. | 343/5 DP |
| 3,449,745 | 6/1969 | Holt, Jr. | 343/16 M |
| 3,149,333 | 9/1964 | Campbell | 343/17.1 R |
| 3,530,465 | 9/1970 | Treffeisen | 343/7 TA |
| 3,579,239 | 5/1971 | Purcell, Jr. et al. | 343/16 M |

Primary Examiner—Benjamin A. Borchelt
Assistant Examiner—G. E. Montone
Attorney, Agent, or Firm—Rolf M. Pitts; H. Fredrick Hamann; L. Lee Humphries

[57] ABSTRACT

In a terrain-following radar system, spatial filter means for improved indication of discrete terrain obstacles such as towers, Terrain-following samples ($\Delta\gamma$) for a given radar range-time are time averaged over a preselected plurality ($n$) of successive pulse repetition intervals, the time-averaged samples being thresholded by a time-varied threshold value which varies from a preselected $+\Delta\gamma$ maximum through a null to a preselected $-\Delta\gamma$ maximum over each system pulse repetition period, as to be indicative of a probable terrain warning situation of interest at such sampled range. Non-averaged samples are dual-level thresholded by the time-varied threshold value and tested to determine the occurrence of at least a preselected number (M) of samples of substantially like magnitudes out of $n$ successive pulse repetition intervals as to be indicative of a detected probable discrete obstacle or tower occurring within the general clutter at such sampled range. The occurrence of such "M out of n samples" condition having a common value larger than (worse than) the time-averaged clutter value $\Delta\gamma_{avg}$ results in substitution of such "worst" case filtered value for the time-average clutter value, for terrain following purposes. In other words, the worst one of the commonly occurring M out of $n$ tower signal and time-averaged clutter signal is applied as an input to a bipolar peak detector for determining the maximum maneuver or warning signal condition.

15 Claims, 34 Drawing Figures

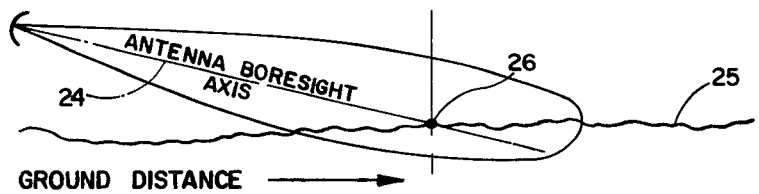
FIG. 3A
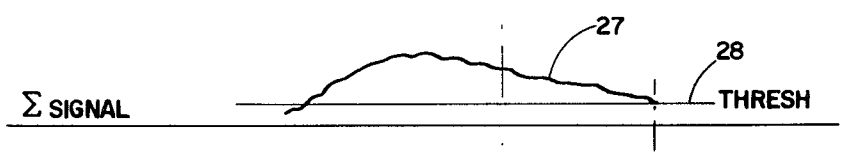
FIG. 3B
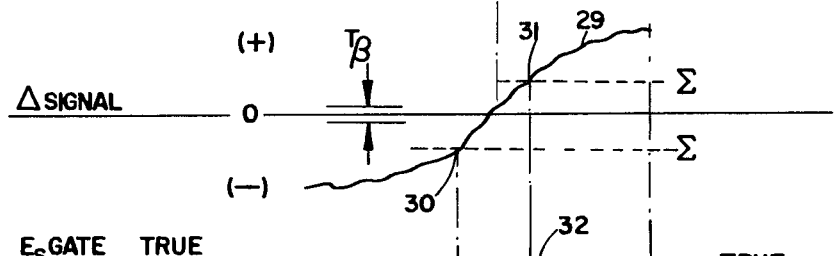
FIG. 3C
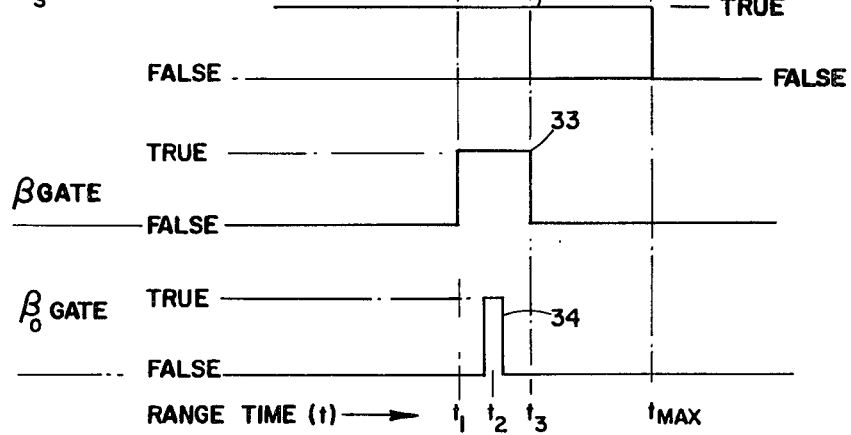
FIG. 3D
FIG. 3E
FIG. 3F

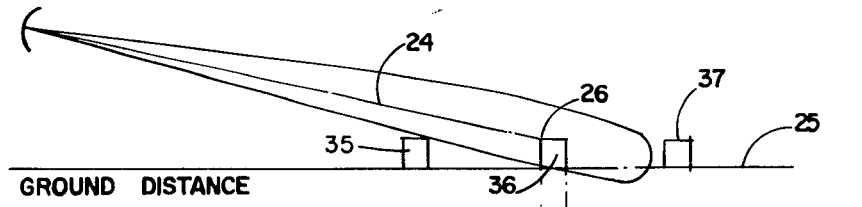
FIG. 4A
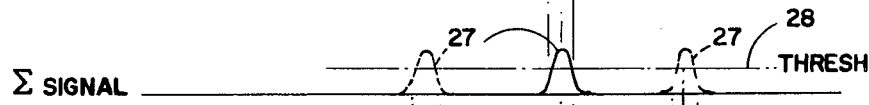
FIG. 4B
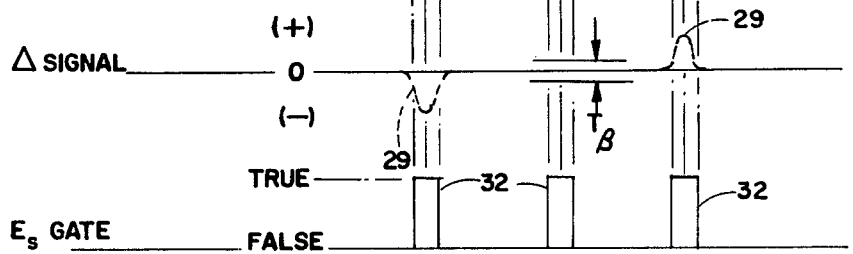
FIG. 4C
FIG. 4D
FIG. 4E
FIG. 4F
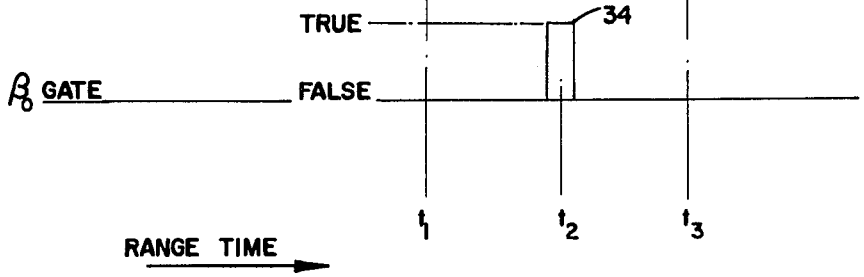

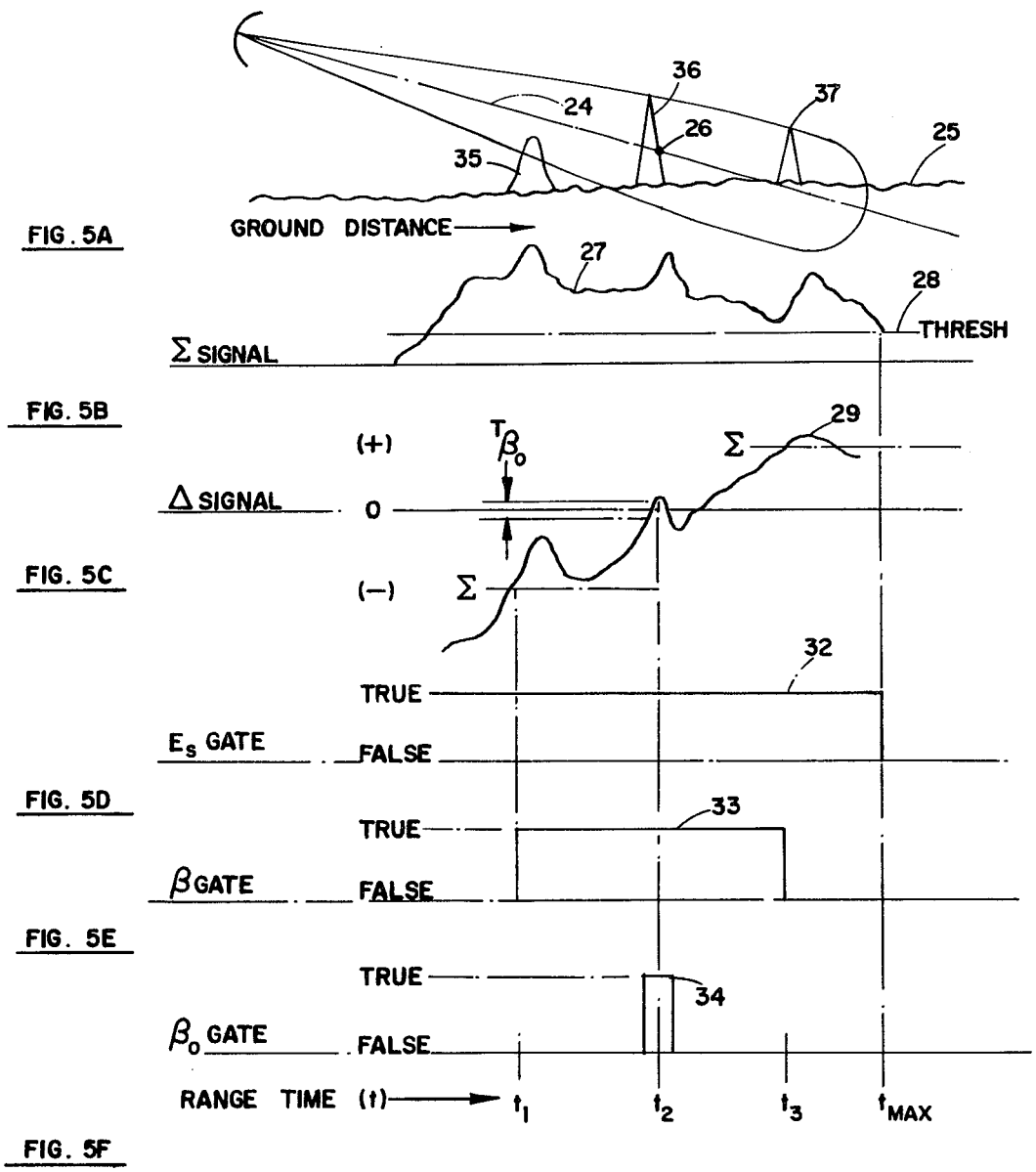

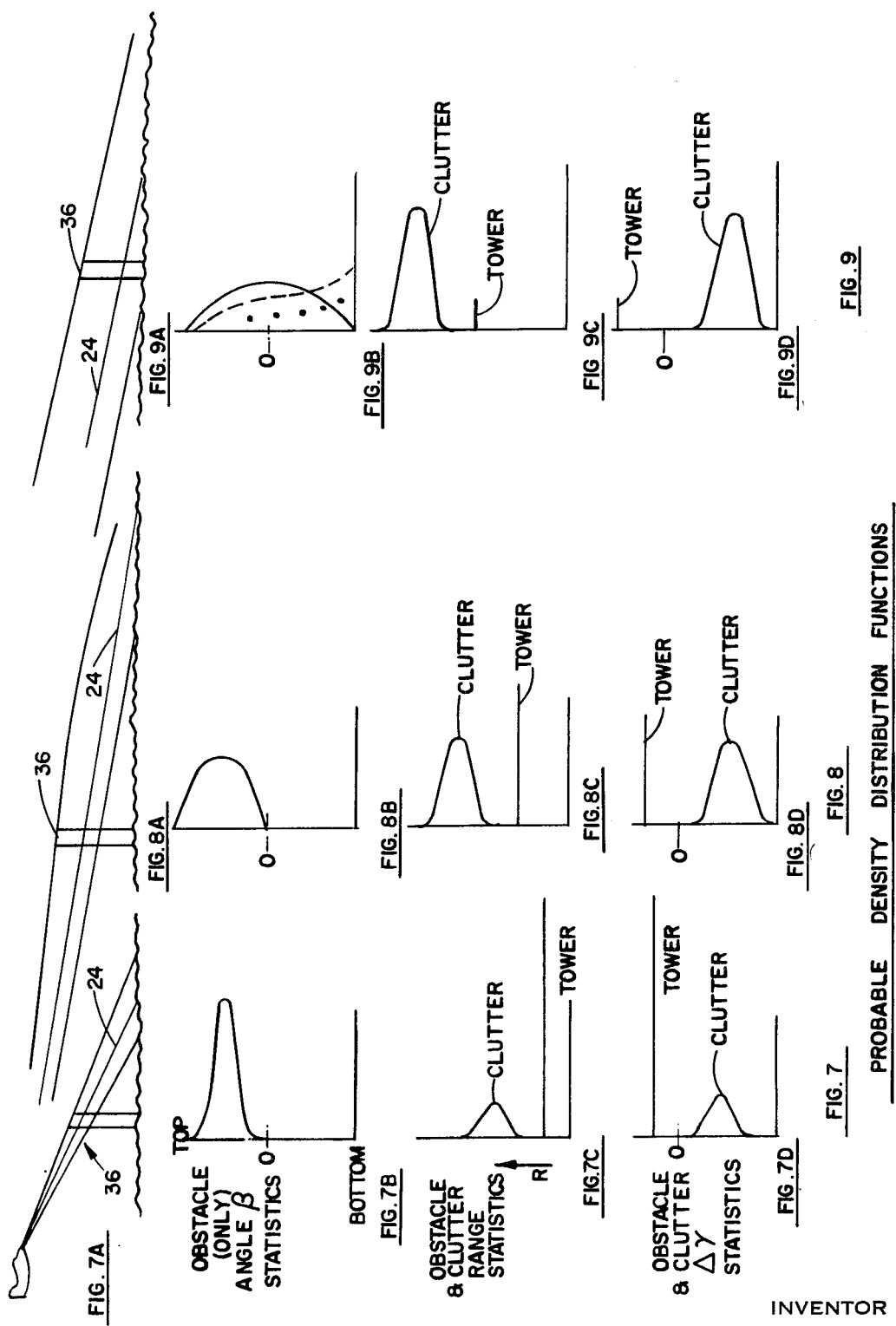

TERRAIN-FOLLOWING RADAR SYSTEM

CROSS-REFERENCES TO RELATED APPLICATIONS

U.S. Pat. application Ser. No. 540,053 filed Apr. 4, 1966, by Guy P. Bayle, et al., for Terrain Warning System.

BACKGROUND OF THE INVENTION

In the prior art of terrain-following radar systems, it is desired to accurately detect a terrain profile for control purposes, in controlling a military aircraft to a low altitude flight profile above such terrain profile. In this way, advantage is taken of the masking effect of the terrain to make detection of the aircraft more difficult.

A typical terrain-following system, employed by a user-aircraft, in general comprises a forward-looking airborne radar for terrain-profile sensing, and signal-processing or computing means responsive to the flight condition of the user-aircraft for comparing the sensed terrain profile situation with preselected aircraft maneuver-limitations, to provide a warning or flight maneuver (fly up/fly down) signal. In general, a preselected clearance reference surface below the aircraft is simulated and having a ski-toe forwardly at a preselected range (to prevent premature "fly-up" in response to far-distant targets, although located above the preselected clearance reference below the aircraft). As the aircraft flight path $\gamma$ deviates from zero to a negative (fly-down) flight path, both the vertical clearance reference distance and the ski-toe range are compensatorily increased to accommodate the increased vertical and forward transfer or space required in which to effect a terrain-avoidance pull-up maneuver. A further description of such systems is included in U.S. Pat. No. 3,396,391 issued Aug. 6, 1968 to J. O. Anderson, et al., for Terrain Following System.

An especially distressing environment in which to perform a terrain following flight mission is one in which the terrain includes tall, narrow vertical obstacles such as towers and the like which may be ordinarily difficult to discern amid the general clutter background in which they occur.

Accordingly, it is a broad object of the subject invention to provide means for providing improved safety in performing terrain-following over vertical towers.

It is another object to provide improved detection of discrete terrain obstacles such as vertical towers.

Another object of the invention is to provide reduced clutter content in radar signals indicative of sensed discrete terrain obstacles such as vertical towers.

These and other objects of the invention will become apparent from the following description taken together with the accompanying drawings in which.

Figure 2:
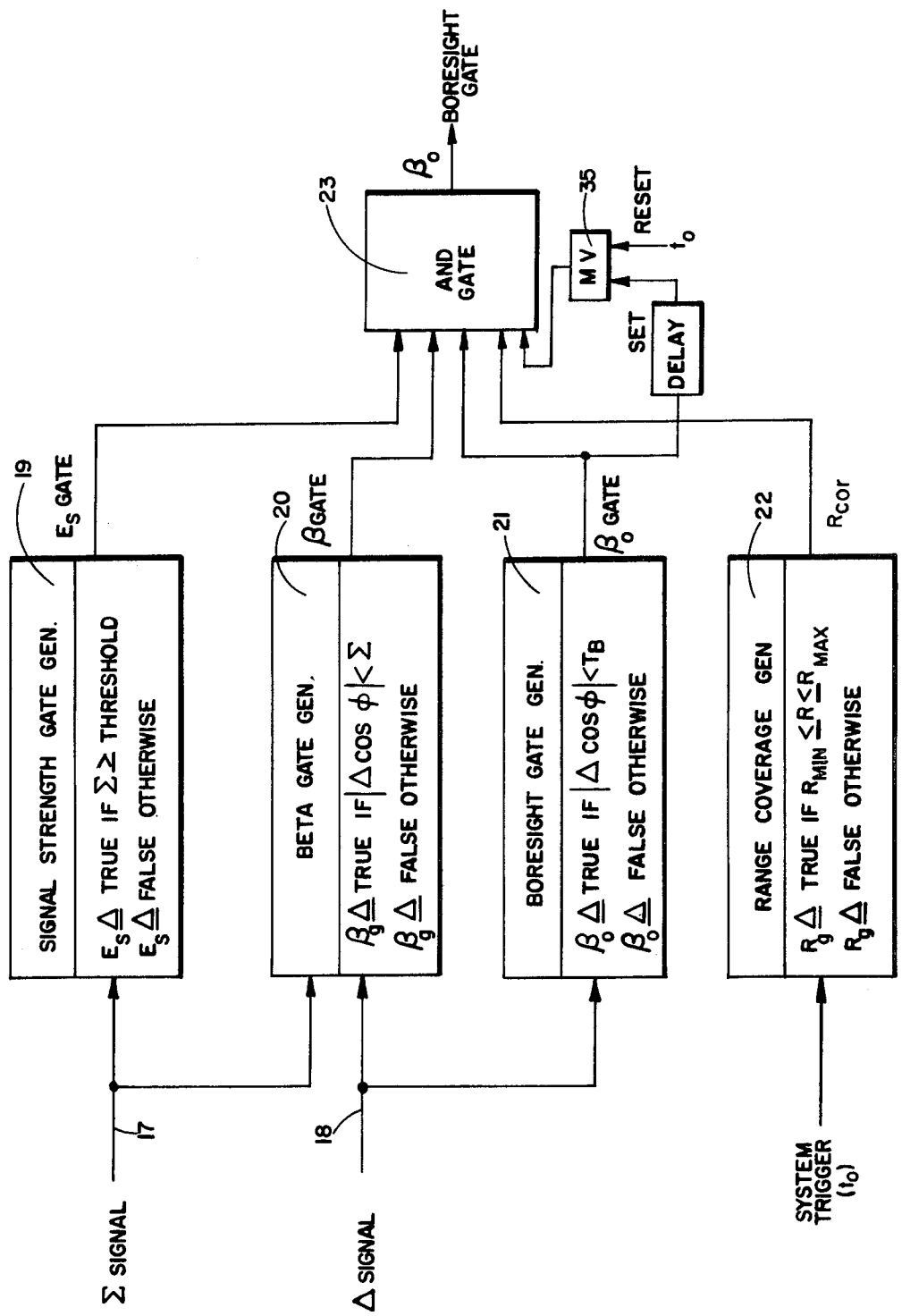
FIG. 2 is a block diagram of an aspect of the invention as applied to an on-boresight type monopulse system application.

FIGS. 3A-3F, 4A-4F, and 5A-5F are illustrations of three respective exemplary sensed terrain situations and associated families of time history responses of various elements of the arrangement of FIG. 2.

Figure 6:
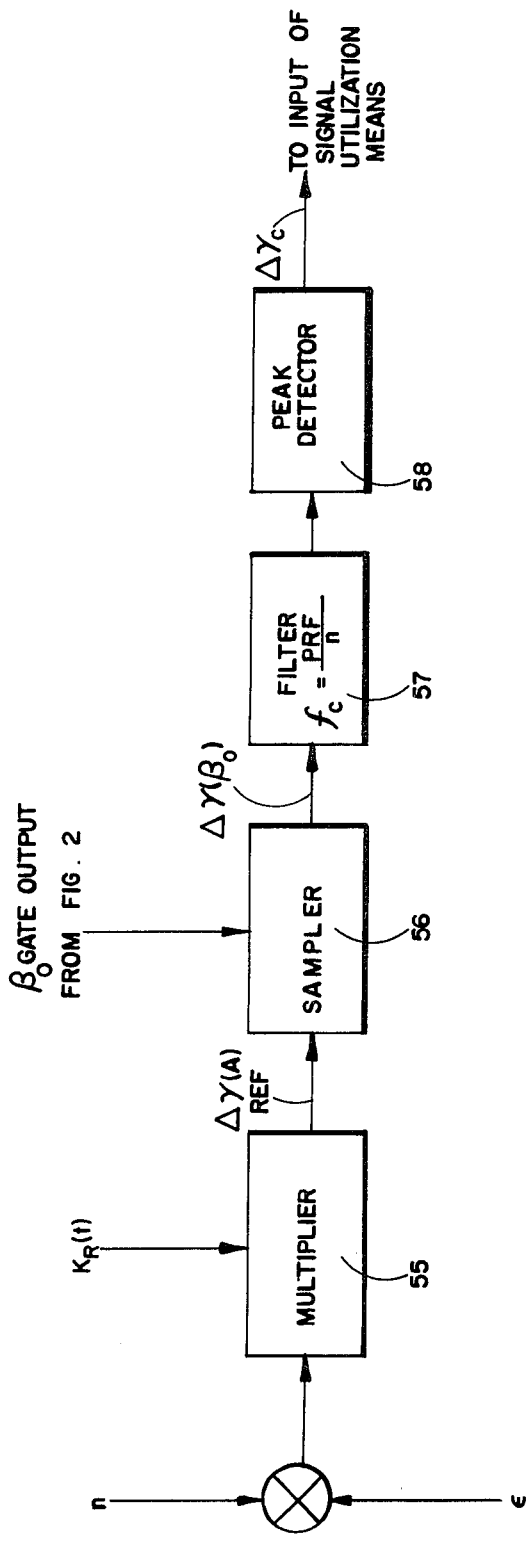

FIG. 6 is a block diagram of an exemplary on-boresight monopulse type system for an airborne terrain-following application.

Figure 10:
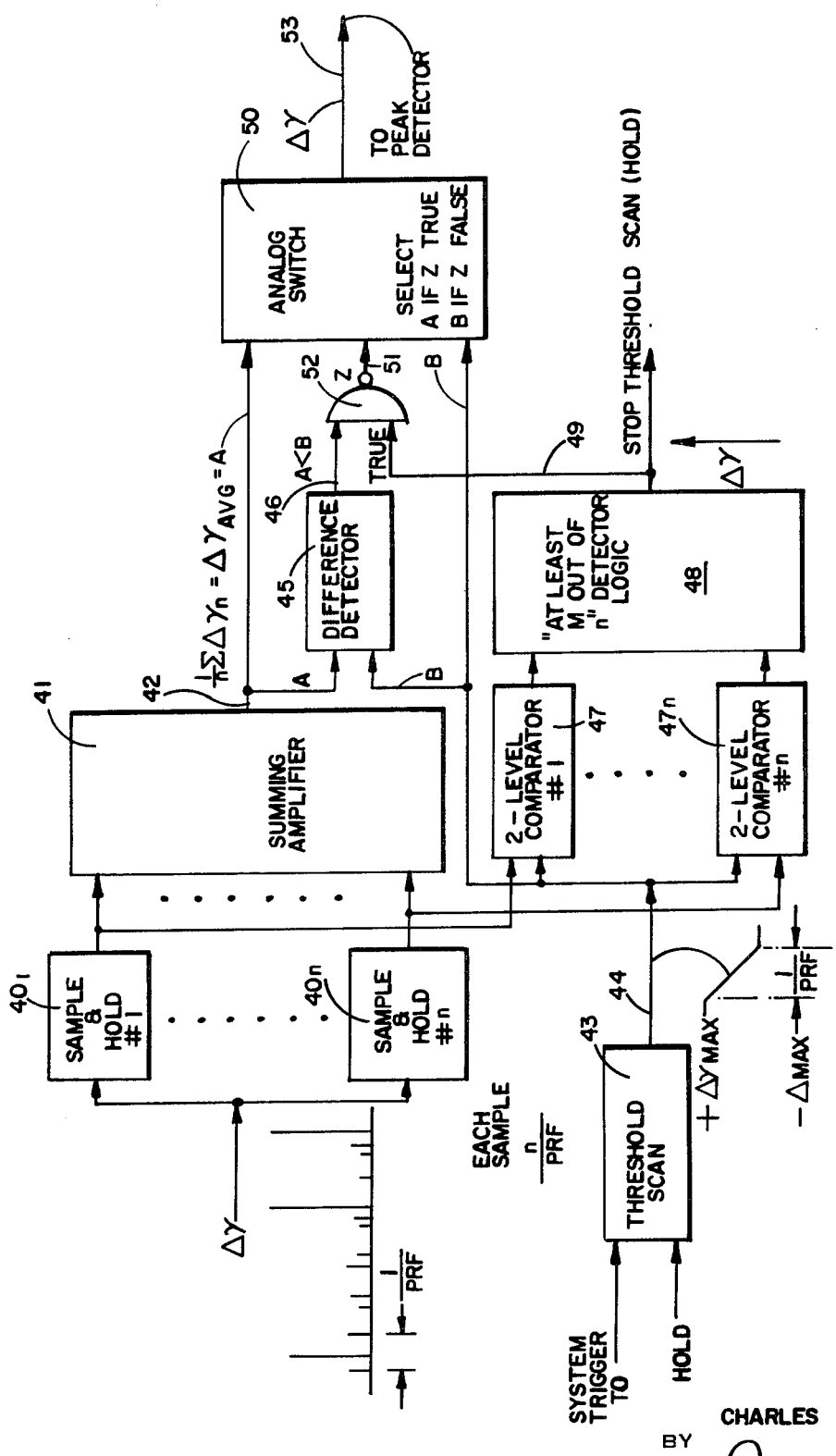

FIGS. 7A-D, 8A-8D and 9A-9D are illustrations of three respective exemplary sensed terrain situations and associated families of statistical properties of the sensed parameters thereof; and FIG. 10 is a block diagram of a preferred embodiment of a spatial filtering aspect of the invention.

In the figures, like reference characters refer to like parts.

DESCRIPTION OF THE PREFERRED EMBODIMENTS

Figure 1:
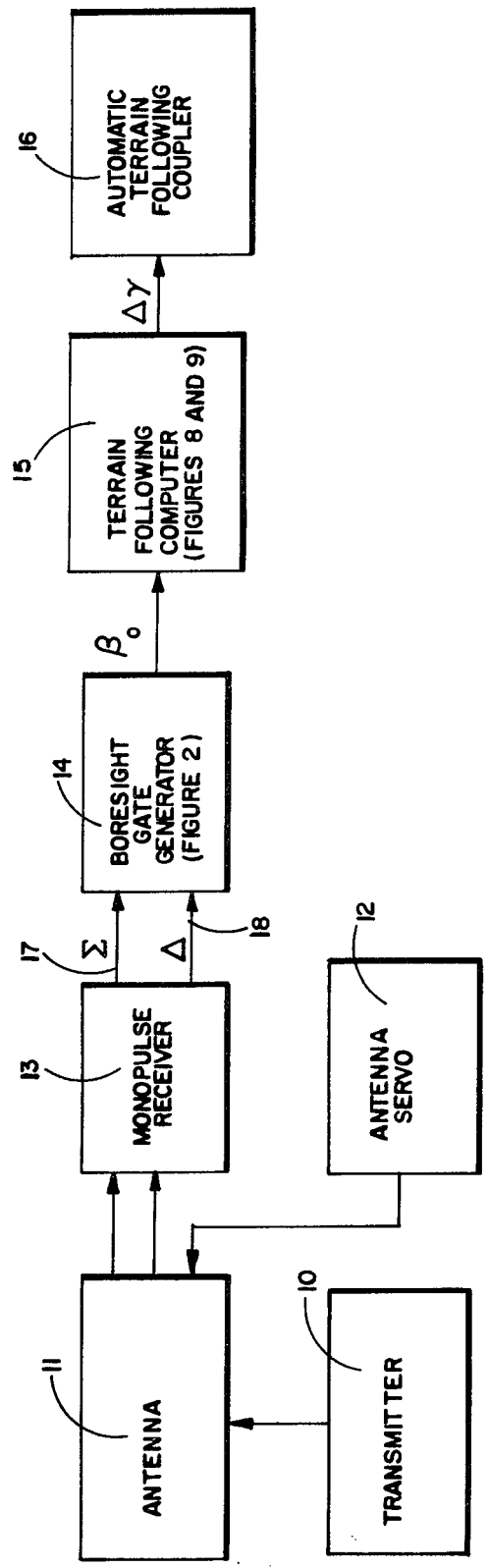
FIG. 1 is an exemplary block diagram of a monopulse system in which the concept of the invention may be advantageously employed.

Referring now to FIG. 1, there is illustrated a block diagram of an exemplary terrain-following radar system of the monopulse type, in which the concept of the invention may be advantageously employed. There is provided a pulsed transmitter 10 output-coupled to a directional antenna 11 in a manner known, per se. An antenna servo 12 may cooperate with antenna 11 to provide directional scanning of directional antenna 11, if desired. Antenna 11 is maintained slightly depressed to detect terrain ahead of and below the aircraft, and is preferrably of the multiple feed type, as to be useful in a monopulse system application. A monopulse receiver 13 is responsively coupled to the multiple feeds of antenna 11 for providing a monpulse sum ($\Sigma$) and difference ($\Delta$) video signal output.

The monopulse video outputs of receiver 13 are utilized in a gating signal generator 14 for generating a gating signal $B_o$ indicative of the detection of a discrete terrain feature of interest occurring on or along the boresight axis or beamwidth axis-of-symmetry of antenna 11. The range-time occurrence of such signal $B_o$ within a pulse repetition interval is indicative of the range distance of the sensed obstacle, while the direction of the antenna boresight is thus indicative of the direction of the sensed obstacle. Such data as to the direction and range of a sampled portion of a terrain profile may thus be tested against a terrain clearance reference to compute vertical steering signals indicative of a desired flight path change, $\Delta\gamma$ by means of a terrain-following computer 15 which may be further responsive to own-aircraft flight path, ($\gamma$), own aircraft speed ($U_o$), and antenna orientation ($\eta$). A flight control coupler 16 may input-couple an automatic flight controller to computer 15. Alternatively, a display indicator or other signal utilization means may be employed as element 16.

Boresight gate generator 14 is shown more particularly in FIG. 2 as structure for generating a gate control signal indicative of the occurrence of an on-boresight target condition under the conditions that (1) the receiver sum channel output (of FIG. 1) exceeds a preselected threshold, (2) the receiver monopulse difference channel output be less than that of the sum channel and below a preselected threshold, and (3) the target signal occur during a range interval of interest. The sum channel threshold logic function is provided in FIG. 2 by thresholded two-state signalling means 19 responsively coupled to receiver sum channel 17 (of FIG. 1) and assures that the received signal is a target of significant interest as to lie within the mainlobe of the antenna response pattern, and not within a sidelobe or direction not of interest.

A beta gate generator 20 responsively coupled to both sum channel 17 and difference channel 18 of FIG. 1 provides a logic gating output signal (B gate) when the difference channel output is less than that of the sum channel ($\Delta < \Sigma$); while a boresight gate generator 21 provides "an on-boresight" ($B_o$ gate) signal of interest in response to the monopulse difference signal (on line 18) falling below a preselected threshold ($\Delta \leq T_B$). By means of a coincidence, or AND, gate 23 responsive to the outputs of gates 19, 20, 21, a boresight gate signal $B_o$ is provided which is unambiguous, in that the coincidence of gates $E_s$ and B with the $B_o$ gate check against the ambiguity of a monopulse difference channel null occurring in a sidelobe region and falsely indicative of a mainlobe on-boresight detection. The construction and arrangement of thresholded gate generators 19 and 20 are substantially the same and are well understood in the art.

A further gating input ($R_{cov}$) representing a limited range time interval of interest ($R_{min} \leq R \leq R_{max}$) is provided to AND gate 23 by means of a range coverage generator 22 responsive to a system trigger ($t_o$) of transmitter 10 (of FIG. 1). In this way, AND gate 23 is gated-off to system responses to near-range targets not of interest (as lying directly below the aircraft and possibly within the antenna sidelobe response region) as to improve system discrimination against such sidelobe response. Also, the gating-off at range times corresponding to ranges greater than $R_{max}$ reduces unnecessary system response to terrain obstacles outside a maneuvering range of interest, particularly in a turning maneuver. Conceptually, gating signal generator 22 may be a tapped delay line with the $R_{cov}$ input of gate 23 connected to only those output taps of the delay line corresponding to the range interval of interest. Alternatively, to the tapped delay line, a clocked shift register may be used. A selectively range-blanking arrangement for use in turning maneuvers of an aircraft using a terrain-following system is more fully described in U.S. application Ser. No. 540,053, filed Apr. 4, 1966 now U.S. Pat. No. 3,680,049 for Terrain Warning Radar System, by Guy P. Bayle, et al., assignees to North American Rockwell Corporation, assignee of the subject invention.

The cooperation of the arrangement of FIG. 2 may be more easily appreciated by reference to FIGS. 3, 4 and 5, illustrating three exemplary terrain situations.

Referring to FIG. 3, there is illustrated an exemplary first case terrain situation involving no discrete terrain obstacle and a family of associated amplitude responses of certain elements of the arrangement of FIG. 2 (in cooperation with the system of FIG. 1) as functions of radar range time. In FIG. 3A, the boresight axis 24 of a forward looking narrow beamwidth (say, of antenna 11 of FIG. 1) intersects an obstacle-free terrain profile 25 at point 26. The resulting sum ($\Sigma$) channel response on line 17 of FIG. 2 is shown in FIG. 3B as curve 27, the magnitude of which response decreases as a function of range time due to the attenuation effect of range distance on the received signals from terrain lying at increased range distances, as is well understood in the art, such response at maximum range times or distances falling below the threshold 28 (of generator 19 in FIG. 2), (True state of generator 19 in FIG. 1, corresponding to curve 32 in FIG. 3D). The monopulse difference ($\Delta$) signal response (on line 18 in FIG. 1) is shown as curve 29 in FIG. 3C, the response to near-range terrain below boresight axis intersection 26 producing a negative video response, terrain at a further range beyond boresight axis intersection 26 producing a video response of opposite sense, and terrain on-boresight (point 26) producing a null response (at $t_2$).

Also shown in FIG. 3C are two points 30 and 31 (at times $t_1$ and $t_3$, respectively) between which the magnitude of $\Delta$ response curve 29 is less than that of $\Sigma$ response curve 27, as to result in a true state output from generator 20 in FIG. 2 (curve 32 between the interval $t_2-t_3$ in FIG. 3E). Further shown in FIG. 3C is a threshold region $T_B$ (corresponding to the reference value employed in generator 21 of FIG. 2), which region is traversed by $\Delta$ curve 29 at and about time $t_2$, producing a true output (curve 34 in FIG. 3F) at generator 21 at that time. The coincidence of the true states of generators 19, 20 and 21 (together with generator 22), corresponding to the coincident like states of curves 32, 33 and 34 at and about time $t_2$ in FIG. 3) results in a true output from AND gate 23 (in FIG. 2). The range time of such occurrence and the coincident depression angle or direction of the boresight axis 24 may then be employed to provide the polar coordinates of such terrain profile sample.

A second exemplary terrain situation, involving three discrete terrain obstacles, spaced apart from each other and amid a substantially non-reflective background, is shown in FIG. 4. Such substantially nonreflective background is represented by the absence of a received sum ($\Sigma$) signal (curve 27 in FIG. 4B) in the intervals between the receiver response at times $t_1$, $t_2$, and $t_3$ and corresponding to the three obstacles 35, 36 and 37 in FIG. 4A. In other words, outside those times, response curve 27 is below the $\Sigma$ threshold value 28 in FIG. 4B, resulting in the $E_s$ gating signal response of curve 32 in FIG. 4D. However, the occurrence of a finite monopulse difference ($\Delta$) signal 29 which is still less than the sum ($\Sigma$) signal 27 (True state of curve 33 in FIG. 4E at times $t_1$, $t_2$ and $t_3$) and at the same time within the threshold $T_B$ (of FIG. 4C) occurs only at $t_2$ (curve 34 in FIG. 4F).

The third exemplary terrain situation of FIG. 5 combines the reflective terrain style of the first described case and the three obstacles of the second described case. The resultant continuous response of the sum ($\Sigma$) channel (curve 27) assures an $E_s$ gate response (curve 32) similar to that of FIG. 3D. The difference ($\Delta$) channel response (curve 29) resembles that of FIG. 3C but for the three points of (negative) inflection, corresponding to the vertical angles-off-boresight of the centroids of obstacles 35, 36 and 37, as to result in a B gate response (curve 33 between $t_1$ to $t_3$ in FIG. 5E) somewhat resembling that of FIG. 3E. It is to be noted that within the interval of $t_1-t_3$ (as marked-out by curve 33 in FIG. 5E) the monopulse difference ($\Delta$) curve 29 traverses the on-boresight threshold region $T_B$ more than once. However, delayed lock-out logic such as a multivibrator 35 responsive to a first-occurring $B_o$ gate signal may be used in FIG. 2 to gate-off the response of AND gate 23 to subsequent $B_o$ gate signals within a given pulse repetition interval, the multivibrator being reset by the system trigger ($t_o$) of the subsequent pulse repetition interval so as to unblock gate 23. Thus, the first or closest obstacle will be used for earliest warning signal computation.

One form of on-boresight bore-sight monopulse system useful in a terrain-following situation is shown in the single line block diagram of FIG. 6. In such arrangement the scanned antenna angle $\eta$ may be compensatorily biased by a stabilization correction $\epsilon$ from inertial stabilization means well known in the art, and the stabilized angle value periodically multiplied or modulated (by multiplier 55) over the system pulse repetition period as a function of range-time by a factor $K_R(t)$, the product or modulation result corresponding to a selectively shaped clearance plane of interest, as is more fully explained in the above noted U.S. Pat. No. 3,396,391 to J. O. Anderson et al. Gating of the modulated reference signal in response to a detected target on-boresight condition (indicated by a $B_o$ gate output from element 23 of FIG. 2) provides a sampled maneuver signal $\Delta\gamma(B_o)$ at the output of sampler 56. In a conventional terrain following system, such output is then filtered or smoothed by an element 57 having a response or cut-off frequency $f_c$ not exceeding an integer submultiple of the pulse repetition rate or PRF (e.g., $f_c = \text{PRF}/n$). Thus, the filter response serves to attenuate noise while also acting as a data integrator over a limited time interval. The output of the filter is then peak-detected by a peak-detector 58, which in an elevationally nodding, on-boresight processor, may employ the plurality of pulse repetition intervals of a nod cycle for such peak-detection function (i.e., detection of a "worst" maneuver case).

Because of the heavy smoothing effect of filter 57, discrete obstacles or vertical towers of small radial extent (relative to the system range resolution) protruding above the general terrain may not be clearly discerned by the terrain-following system, with the result that a flight hazard may be undetected.

Accordingly, a further aspect of the invention relates to a spatially responsive filter to be substituted for the time-domain filter 57 of FIG. 6 or of other types of terrain-following data processors.

Now, in current radar systems for modern military aircraft applications it is not unusual, and may even be preferred, that the transmitter 10 (of FIG. 1) employ frequency agility or multiple frequency transmission, whereby the carrier frequency is changed from pulse to pulse for anti-jam or electronic counter-counter measure purposes. However, the received signals from the terrain and obstacle at a given range bin (corresponding to a transmitted pulse width) will appear to fluctuate or "sparkle" (over the period of several pulse repetition intervals) with such frequency changes due to changes in the manner of constructive and destructive additions of the components of the received signal from the composite scatters comprising the clutter or terrain background, in response to wavelength changes of the transmitted energy. Such phenomenon is understood to those skilled in the art, being more fully explained in U.S. Pat. No. 3,500,404 issued Mar. 10, 1970, to J. O. Anderson, et al., for "Radar System Having Improved Response to Small Targets." Such pulse-to-pulse random-function effect for a representative range bin also tends to result in variations in the observed monopulse difference ($\Delta$) channel signal. Such measured angle is influenced by the physical arrangement of the tower and of the surrounding clutter. In other words, jitter is observed in the observed angle-off-boresight of the centroid of a terrain obstacle such as a vertical tower or the like, as to prevent correct estimation of an on-boresight condition of such tower on successive pulse repetition intervals, with the result that a boresight gate signal, $B_o$, may not be generated on successive return echoes from such tower. Initially, it is more likely that such gate signal will be generated only when the antenna boresight intersects the terrain.

Three exemplary cases of such receiver boresight signalling situation are depicted in FIGS. 7, 8 and 9 for successive tower-range situations, and show for each of such situations the probable density distributions of the received signals.

Such probable density distributions are plotted (for each of the situations illustrated in FIGS. 7A, 8A and 9A) for the detected obstacle only angle-off-boresight B, the obstacle and clutter indicated range-time, and the statistics of resultant maneuver angle $\Delta\gamma$ computed by the terrain-following computer.

From FIGS. 7, 8 and 9 it is to be appreciated that the thresholded discrete obstacle or tower signal provides a narrower probability density distribution than that of the general ground clutter (due to the restricted radial extent of the tower as viewed from the forward looking narrow beam-width of the airborne radar antenna).

Such narrower distribution of the statistics of the tower signal, relative to the general clutter return, may be used to distinguish the tower (range or direction) signal from that of the clutter: By summing the samples received for each of successive sample values of a sampled parameter such as monopulse angle B (in an off-boresight processor), range R; or maneuver angle $\Delta\gamma$, the frequency of occurrence of a given value for the parameter (say $\Delta\gamma$) or density function thereof may be observed. From examination of FIGS. 7D, 8D and 9D, it is clear that a reasonably high frequency of occurrence of the larger maneuver angle ($\Delta\gamma$) for the tower 36 will occur as to allow distinguishing it (on such basis) from the lesser maneuver angle values associated with the general terrain in an on-boresight monopulse processor, for example.

The lesser target area and radial extent of the tower relative to those properties of the general clutter area illuminated by the antenna beamwidth and system pulsewidth, provide a lesser received signal return or strength, as to make difficult the distinguishing of such tower from the clutter in a display situation. However, the measurement of such frequency of occurrence over a preselected number of sampled pulse repetition intervals (corresponding to the number of discrete transmitter carrier frequencies utilized) conveniently allows distinguishing such tower data from the terrain data by the simple expedient of thresholding the frequency of occurrence of selected parameter values (say, for $\Delta\gamma$), rather than thresholding the received signal strength used in computing such values. Logic means responsive to such thresholding of frequency of occurrence or truncated probability density distribution function, for selectively gating a terrain following computer, is shown in FIG. 10.

Referring now to FIG. 10, there is illustrated in block diagram form an exemplary embodiment of one concept of the invention. There is provided add-one/drop-one sample data processing means comprising sample-and-hold means $40_1$–$40_n$, commonly responsive to a computed maneuver angle $\Delta\gamma$ or other terrain-following parameter computed each of n successive pulse repetition intervals, where n may be a preselected number corresponding to the number of discrete carrier frequencies, a mutually exclusive one of which frequencies may be employed in a mutually exclusive one of the $n$ successive pulse repetition intervals. Each of sample-and-hold means $40_1$–$40_n$ is responsive to the frequency programmer logic of the frequency agile transmitter (or other system clocking means) for sequentially sampling only a preselected pulse repetition period of each of successive pluralities of n successive system pulse repetition intervals. Such clocking means (not shown) may be comprised, for example, of a shift register $n$ bits long and having a clock input responsive to the system trigger ($t_o$), or other frequency divider means well-understood in the art.

There is also provided in FIG. 10 signal summing means 41 input coupled to respective outputs of sample-and-hold means $40_1$–$40_n$ and suitably gain scaled ($K = 1/n$) for providing a continuous time-averaged output $\Delta\gamma_{avg} = (1/n)\Sigma\Delta\gamma_n$ on output line 42.

A scanned threshold signal generator 43 provides a threshold signal value which is scanned or varied each pulse repetition interval from a maximum value of interest ($+\gamma_{max}$) through zero or null to a minimum value of interest ($-\gamma_{max}$) on output line 44. Such periodically scanned threshold signal on line 44 is compared with the time-averaged signal on line 42 by difference detector means 45, to provide a two-state output on line 46 indicative of whether the time averaged output A is less than the threshold value B.

There is also provided in FIG. 10 frequency of occurrence detecting means comprising dual-level comparators $47_1$–$47_n$ each responsive to a mutually exclusive one of a sample-and-hold means $40_1$–$40_n$ and commonly responsive to threshold generator 43 for providing a two-state output indicative of the occurrence of a sampled-and-held signal approximately equal to said scanned threshold. Detector logic 48, responsive to the two-state outputs of comparators $47_1$–$47_n$, provides a two-state output (on line 49) indicative of the coincident occurrence of at least a preselected number (M) true state inputs out of in inputs thereto. In other words, a substantially non-sparkling or discrete target of interest is indicated by at least a preselected minimum number of terrain-following parameter computations (say, $\Delta\gamma$) at a given range time over $n$ successive pulse repetition intervals, corresponding to the relatively narrow density distribution function shown in each of FIGS. 7D, 8D and 9D for the exemplary tower response there depicted. The "at least M out of $n$" state of logic 48 is also applied as a "hold" or "stop scan" control input of threshold generator 43.

Double throw switch means 50 (provided in FIG. 10) utilizes an alternative one of lines 42 and 44 as a spatially filtered output to a terrain-following $\Delta\gamma$ peak detector, in response to the switching control state of switch control input 51. Control input 51 is responsively connected to a two-state output of a coincidence detector 52 which has a first and second input responsively connected to a respective one of lines 46 and 49.

In normal cooperation of switch 50 and gate 52, the absence of either "A<B" or M at gate 52 (meaning the time averaged $\Delta\gamma$ is greater than the threshold $\Delta\gamma$ and coincidentally that there are less than M out of $n$ sampled $\Delta\gamma$ amplitude coincidences (for a given sampled range bin) results in a False, or first, state applied to the control input 51 of switch 50. The response of switch 50 to such applied first state is to connect output line 53 to the time averaged signal on line 42. If, however, both signal B (at detector 45) exceeds signal A and there are at least M coincident amplitudes out of $n$ successive samples (at logic means 48), which combination of conditions tends to be indicative of a response to tower detection data, then the resulting "True," or second, state of gate 52 causes switch 50 to disconnect line 53 from line 42 and to connect line 53 in circuit with line 44, whereby the output of threshold generator 43 is utilized as the maneuver-angle value of interest. Further, if there are M substantially like values in n successive samples (at logic element 18), then the output state on line 49 is employed as a "hold" control input to generator 43, to stop the scanning thereof, whereby the "held" value on line 44 is utilized as a smoothed maneuver angle ($\Delta\gamma$) value of interest.

In other words, a filtered or smoothed $\Delta\gamma$ signal is provided by the use of the averaged signal ($1/n$)$\Sigma\Delta\gamma_n$ unless either (A<B) and M occurs, meaning that the "worst case" (most positive $\Delta\gamma$ value) is provided by a time-averaged signal indicative of a general clutter condition (False condition of gate 52); otherwise, the output of generator 43 is employed as the $\Delta\gamma$ signal of interest when (1) M is true (indicative of a detected tower in at least M and out of $n$ successive pulse repetition intervals) and (2) the associated (smoothed) value of $\Delta\gamma$ for such M out of $n$ tower detections, as the "held" value (B) of the output of generator 43, is greater than the time-averaged $\Delta\gamma$ (A), (or, A<B) as to indicate the smoothed tower value as the "worst case" (most positive $\Delta\gamma$ value) of interest. That is to say, the "worst" one of a time-averaged $\Delta\gamma$ clutter signal and a smoothed (M out of $n$) $\Delta\gamma$ tower signal is employed as a maneuver angle signal, whereby a reliable smoothed, averaged or filtered maneuver angle signal is provided.

Accordingly, there has been described a terrain-following processor or filter which allows optimum system use of frequency agility, signal smoothing, and obstacle versus clutter statistical signal characteristics.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In a terrain-following directionally ranging system for airborne use, spatial filter means for detecting a discrete obstacle projecting amid a general clutter background and comprising first means responsive to a sampled received signal output of said system for providing a time-averaged sampled bipolar direction angle signal, averaged over a preselected ($n$) number of successive system pulse repetition intervals, second means responsive to said sampled received signal output for providing a signal indicative of any substantially common value occurring for at least M samples of said sampled signal over said $n$ successive pulse repetition intervals, and logic means responsive to said first and second means for gating-on the larger of said time averaged sampled signal and said substantially common value as a warning signal of interest.

2. The device of claim 1 in which there is further included bipolar scannable threshold means for providing a reference value signal, the value of which is progressively varied over the interval of each pulse repetition interval from a maximum value through null to a minimum value, said first means being responsive thereto for thresholding of said sampled signal output.

3. The device of claim 2 in which said logic means is responsive to the coincidence of that M state of said second means and a state of said reference value exceeding said time averaged value for gating-on the coincident value of said reference value signal as a warning signal of interest.

4. The device of claim 2 in which said logic means is further responsive to said threshold means for normally gating-on said time-averaged sampled signal unless either said reference value signal exceeds said time average signal or said M state of said second means occurs.

5. In a terrain-following directionally ranging system adapted for airborne use, logic apparatus for improved reliable signalling of the existence of an on-boresight terrain obstacle of interest, comprising
 first two-state signalling means responsive to a receiver signal output of said system for indicating whether said receiver signal output is of at least a preselected threshold level;
 second two-state signalling means responsive to a target direction indicating signal output of said system for indicating whether an on-boresight target condition exists;
 third two-state signalling means responsive to a system trigger of said system for indicating a range-time interval corresponding to that within preselected minimum and maximum range distances; and
 coincidence gating means responsive to an output of each of said three two-state signalling means for indicating a coincidence of the output states of said two-state signalling means.

6. The device of claim 5 in which said second means for indicating whether an on-boresight target condition exists includes means for disabling said coincidence gating means in the presence of an off-boresight target condition resembling an on-boresight target condition.

7. The device of claim 5 in which said ranging system comprises a monopulse system of the sum and difference type and in which said second two-state signalling means comprises
 fourth signalling means responsive to a monopulse difference channel output of said ranging system for providing an output signal indicative of the occurrence of a difference channel null output; and
 fifth signalling means responsive to said monopulse difference channel output and to a monopulse sum channel output of said system for providing an output signal indicative of the occurrence of a monopulse difference channel output magnitude less than that of said monopulse sum channel output,
 the output signals of said fourth and fifth signalling means being fed to respective inputs of said coincidence gating means.

8. In a terrain-following radar including means for detecting a terrain profile, $\gamma(R)$, spatial filtering means for providing increased discrimination of discrete terrain obstacles from general terrain clutter and comprising
 sample-and-hold means for sampling the terrain profile direction signal at a selected range ($R_i$) over a preselected number ($n$) of successive pulse repetition intervals,
 signal combining means responsive to said preselected number of successive samples at said selected range for providing an output corresponding to the pulse-to-pulse time-averaged history of the magnitudes thereof,
 scannable threshold means for providing a threshold signal indicative of a threshold value,
 difference detector means responsively coupled to said threshold means and said signal combining means for providing a signal indicative of the sense of the magnitude difference between said outputs of said threshold means and said signal combining means,
 two-state comparator means responsively coupled to said threshold means and said sample and hold means for providing a first-state output indicative of those terrain profile samples exceeding said threshold signal,
 two-state logic means responsive to said comparator means for providing a first-state output indicative of the occurrence of at least a preselected number (M) of said $n$ samples which exceed said threshold signal,
 coincidence gate means responsive to said difference detector means and to said threshold means for providing a first-state logic output indicative of the coincidence of both the non-occurrence of a terrain profile sample exceeding said threshold value and the non-occurrence of said first-state of said logic means, and
 double-throw switch means having a control input responsive to the output of said coincidence gate means for alternatively selecting a predetermined one of said outputs of said signal combining means and said logic means in response to a preselected output state of said coincidence gate means.

9. In a terrain-following radar including means for detecting a terrain profile, $\gamma(R)$, spatial filtering means for providing increased discrimination of discrete terrain obstacles for general terrain clutter and comprising
 means responsive to samples of the terrain profile direction signal $\gamma(R)$ at a selected range ($R_i$) over a preselected number ($n$) of successive pulse repetition intervals for providing a signal indicative of the sense of the magnitude difference between a time average of said samples and a selected threshold value,
 two-state comparator means responsive to said threshold value and said time-averaged $n$ samples for providing a first-state output indicative of those terrain profile samples exceeding said threshold value,
 logic means responsive to said comparator means for providing a first-state output indicative of the occurrence of at least a preselected number (M) of said time-averaged $n$ samples which exceed said threshold value,
 coincidence gate means for providing a first-state logic output indicative of the coincidence of both the non-occurrence of a terrain profile sample exceeding said threshold value and the non-occurrence of said first-state of said logic means, and double-throw switch means having a control input responsive to the coincidence of both the non-occurrence of a terrain profile time-averaged sample exceeding said threshold value and the non-occurrence of said first-state of said logic means for alternatively selecting a predetermined one of said time-averaged samples and the output of said logic means in response to a preselected output state of said coincidence gate means.

10. In a terrain-following radar including means for detecting a terrain profile, $\gamma(R)$, spatial filtering means for providing increased discrimination of discrete terrain obstacles from general terrain clutter and comprising means responsive to samples of the terrain profile direction signal $\gamma(R)$ at a selected range ($R_i$) over a preselected number ($n$) of successive pulse repetition intervals for providing a signal indicative of the sense of the magnitude difference between a time average of said samples and a selected threshold value, logic means for providing a first-state output indicative of the occurrence of at least a preselected number (M) of said time-averaged $n$ samples which exceed said threshold value, coincidence gate means for providing a first-state logic output indicative of the coincidence of both the non-occurrence of a terrain profile sample exceeding said threshold value and the non-occurrence of said first-state of said logic means, and double-throw switch means having a control input responsive to the coincidence of both the non-occurrence of a terrain profile time-averaged sample exceeding said threshold value and the non-occurrence of said first-state of said logic means for alternatively selecting a predetermined one of said time-averaged sample and said output of said logic means in response to a preselected output state of said coincidence gate means.

11. The device of claim 10 in which said terrain-following radar is of the frequency agility type transmitting a different one of $n$ discrete frequencies upon each of n successive pulse repetition intervals, corresponding to the period over which said samples are time-averaged.

12. The device of claim 10 in which said selected threshold value is a progressively varying one over a pulse repetition interval, varying from a maximum positive value through a null to a maximum negative value.

13. The device of claim 10 in which said terrain-following radar is of the frequency agility type transmitting a different one of $n$ discrete frequencies upon each of n successive pulse repetition intervals, corresponding to the period over which said samples are time-averaged and in which said selected threshold value is a progressively varying one over a pulse repetition interval, varying from a maximum positive value through a null to a maximum negative value.

14. The device of claim 10 in which said double-throw switch means selects said time-averaged sample in response to an output state of said coincidence of both non-occurrence of a terrain time-averaged sample exceeding said threshold value and the non-occurrence of at least a preselected number (M) of said $n$ time-averaged samples.

15. In a terrain-following radar including means for detecting a terrain profile, $\gamma(R)$, spatial filtering means for providing increased discrimination of discrete terrain obstacles from general terrain clutter and comprising means responsive to samples of the terrain profile direction signal $\gamma(R)$ at a selected range ($R_i$) over a preselected number ($n$) of successive pulse repetition intervals for providing a signal indicative of the sense of the magnitude difference between a time average of said samples and a selected threshold value, logic means for providing a first-state output indicative of the occurrence of at least a preselected number (M) of said time-averaged n samples which exceed said threshold value, and alternative output gating means having a two-state logic control input responsive in a first state to the coincidence of both the non-occurrence of a time-averaged sample exceeding said threshold value and the non-occurrence of at least a preselected number (M) of time-averaged samples of said n successive time-averaged samples which exceed said threshold value for gating-on said time-averaged sample, said threshold value being alternatively gated-out in an alternative second state of said logic control input.

* * * * *